United States Patent

[11] 3,565,179

[72] Inventor Alvin E. Paliani
 1353 W. Houston, Fullerton, Calif. 92633
[21] Appl. No. 738,733
[22] Filed June 14, 1968
[45] Patented Feb. 23, 1971

[54] SOD-TRIMMING DEVICE FOR SPRINKLER HEADS
 1 Claim, 3 Drawing Figs.
[52] U.S. Cl. .................................................. 172/19,
 30/300
[51] Int. Cl. ..................................................... A01b 45/04
[50] Field of Search ........................................ 172/19, 1;
 273/32, 34; 175/263, 327; 145/119, 120; 77/69;
 143/85; 30/300, 301, 310, 316

[56] References Cited
UNITED STATES PATENTS
1,281,627 10/1918 Misener et al. ............... 77/69
1,340,927 5/1920 Whitman ...................... 172/1
1,480,151 1/1924 Cosman ....................... 172/19X
2,086,435 7/1937 Rapp ............................ 30/301

FOREIGN PATENTS
739,773 1/1944 Germany ..................... 145/120
959,857 10/1949 France ........................ 143/85

Primary Examiner—Robert E. Pulfrey
Assistant Examiner—James W. Peterson
Attorney—Mansel A. Gray ABSTRACT: A sod-trimming device for sprinkler heads, having a disc-shaped holder with a handle attached to the top center thereof and one or more generally circular cutter blades tapered in height and formed with sawtoothed lower edges, the upper edges being secured in one of a plurality of spaced concentric reentrant grooves so that the sod may be trimmed around the sprinkler head when one of the blades encircles the head and rotation is imparted to the holder.

PATENTED FEB 23 1971
3,565,179
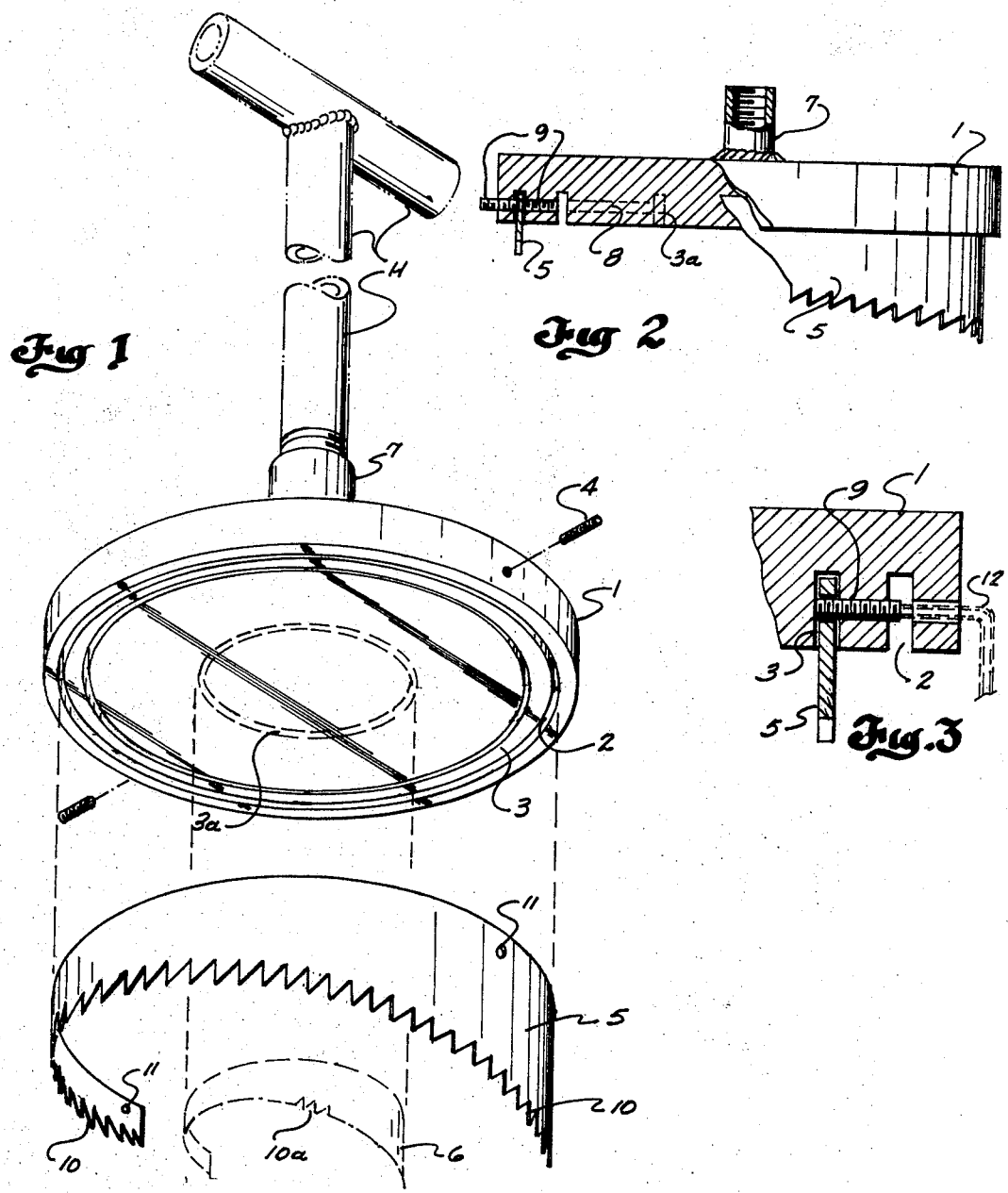
INVENTOR.
ALVIN E. PALIANI
BY
AGENT

SOD-TRIMMING DEVICE FOR SPRINKLER HEADS

This invention is related to a sod-trimming device for sprinkler heads wherein the said device is placed directly over the sprinkler head, and by a simple turning movement the sod is cut away from around the sprinkler head.

Heretofore it has been the practice in cutting away the sod from sprinkler outlets to employ a manually operated saw or knife which entails considerable effort and loss of time. Also the results are not as neat and ornamental as that produced by the operation of the trimmer of the present invention.

It is therefore the principal object of the present invention to provide a device which is simple to operate, and commercially economical to manufacturer for trimming around sprinkler heads.

Another object of the present invention is the convenient means of inserting or removing the blades in the circular disc holder member and the arrangement of the handle member thereon.

A further object of the device of the present invention is to provide a means of adjusting the blade members to provide for varying the diameter of the piece of sod which is cut by the said trimmer.

These and other objects and advantages will be apparent as the specification is considered in connection with the accompanying drawings in which preferred embodiments of the invention are illustrated by way of example, and wherein:

FIG. 1 is an exploded perspective view of the sod trimmer with the blade members shown in spaced relation to the holder, and with portions in broken lines and other parts broken away for convenience of illustration;

FIG. 2 is a side elevational view of the blade holder and blade seated therein, and partly in section; and FIG. 3 is a somewhat enlarged vertical sectional view similar to the sectional portion in FIG. 2, but with parts illustrated in broken lines to indicate the means of blade attachment.

Referring more particularly to the drawings, wherein similar reference characters designate like parts throughout the several views, the circular disc-shaped holder 1 is secured to the handle H by means of the internally threaded member 7 which is integral with the said disc-shaped holder 1, and disposed normally from the upper central portion thereof.

The lower face of the said disc-shaped holder is provided with a series of concentric reentrant grooves 2, 3, and 3a into which the circular cutter blades 5, 6 are adapted to be secured by screw members 9 which may be passed through openings 11 in blade 5. When an inner blade such as 6, for instance, is used, then the blade 6 is inserted in the 3a and the screw 9 advanced through the opening 8 to contact blade 6.

In securing the circular blades 5 or 6 in the inner grooves 3 or 3a, an Allen wrench 12 may be used as indicated in the broken line portions of FIGS. 2 and 3. It is also noted that a circular blade may be secured in the outer groove 2, by a screw 4 contacting the blade 5 at any point on the outer surface of blade 5 instead of inserting the screw 4 through opening 11 in the said blade.

The lower edge of the respective blades 5, 6 are provided with saw teeth, and the circular blades 5, 6 are tapered in height from one end to the other. FIG. 1 of the drawing illustrates a rather conventional T-shaped handle which may be secured to the internally threaded member 7 and which in normal use of the sod trimmer of the present invention may be of any desired length; usually sufficient to permit use of the device when the user is in substantially erect position. This is one of the advantages to be availed of in the operation of the sod cutter of the present invention.

Other features of this invention include the interchanging of the cutter blades and the tapered formation thereof which causes the teeth thereon to gradually and progressively penetrate and saw through the sod around the sprinkler head.

By means of the above mentioned taper of the circular cutter blade, it is only necessary to execute a single turn of the cutter to cut the sod away from the sprinkler head.

It will, of course, be understood that the particular shape of the blades is susceptible of various revisions and that the embodiments shown and described herein are by way of illustration only. Thus various improvements may be made without departing from the scope and spirit of the appended claim.

I claim:

1. In a device for trimming sod and grass around lawn sprinkler heads comprising a flat disc plate, a plurality of spaced concentric grooves in the bottom face of said plate, a generally circular thin cutting blade removably inserted in one of said grooves and projecting therefrom, means for securing said blade in said groove, said blade being tapered in height from end to end and having saw teeth in the tapered lower edge thereof and handle means extending vertically and centrally from the upper face of said plate for positioning said plate and blade in encircling relation relative to the sprinkler head whereby rotation imparted thereto will cause said blade teeth to progressively bite into and form a circular cut in the sod around the head.